UNITED STATES PATENT OFFICE.

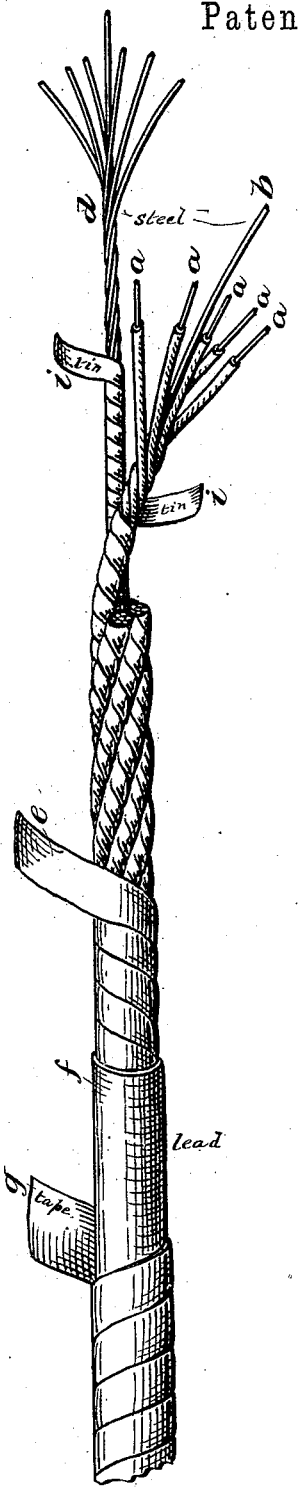

FRANZ C. GUILLEAUME, OF COLOGNE, PRUSSIA, GERMANY.

TELEPHONE-CABLE.

SPECIFICATION forming part of Letters Patent No. 297,688, dated April 29, 1884.

Application filed November 3, 1883. (No model.)

*To all whom it may concern:*

Be it known that I, FRANZ CARL GUILLEAUME, a subject of the Emperor of Germany, residing at Cologne, in Prussia, in the Empire of Germany, have invented certain new and useful Improvements in Telephone-Cables, of which the following is a specification.

Whereas the present system of constructing telephone-lines is acknowledged to become more and more inadequate as telephonic communication is extending in large towns, I have invented the aerial cable hereinafter described, which is to replace the complicated and cumbersome system of overhead wires and retrench the same within practicable limits, lessening at the same time the disturbing influence of induction by providing amply for discharge, and thus insuring a clear and distinct telephonic conversation. I propose to employ such aerial cables in connection with the usual overhead wires, and with a view to render the cable serviceable for the combined system of cables and wires. I have reduced its diameter and its weight to a minimum, and I have made it flexible, and at the same time of sufficient tensile strength for crossing the large spans which occur in the construction of telephone-lines.

The drawing shows a short section of my cable.

I now proceed to describe the cable.

To begin with, I twist five insulated copper wires, $a$, round a non-insulated 6" wire, $b$, of cast-steel of great tensile strength, which serves for earth-connection, and also as straining-wire. I tape the strand of five insulated wires with tin-foil, $i$, or other suitable conducting material. I then twist five such tin-foil-taped strands round a core consisting of a strand of seven or any other suitable number of cast-steel wires, $d$, of great tensile strength, taped with tin-foil, $i$, or any other suitable conducting material, and likewise serving both for earth-connection and for straining purposes. The cable, which is thus formed of twenty-five insulated wires, is then taped with prepared insulating-tape $e$, and sheathed with lead, $f$, or any other like covering and protecting material, over which I provide a serving of asphalted or otherwise prepared tape or yarn, $g$, with a coat of white paint. The cable is made absolutely air and water tight. Each conductor is preferably insulated with a material specially prepared by me, (which it is not necessary to describe,) which is not deteriorated or spoiled in any way by heat or cold. The number of strands in the cable and of insulated wire in each strand may be varied at will, according to circumstances. The cable may also be provided with a double coating of lead with a wire sheathing; or it may be strengthened in any other suitable way to render it fit for being laid under ground and under water.

I claim as my invention—

1. A cable composed of strands wrapped spirally around a core-strand, $d$, of non-insulated wire, the said wrapping-strands being composed of a series of insulated wires, $a$, wrapped spirally around a single non-insulated wire, $b$, as set forth.

2. The cable described, composed of the strands of insulated wires $a$ and non-insulated wire $b$, wrapped spirally around a core, $d$, of non-insulated wires, the said strands and core being wrapped with tin-foil tape, as set forth.

In testimony whereof I have hereunto set my hand, at Cologne, this 29th day of August, 1883, in the presence of two subscribing witnesses.

F. C. GUILLEAUME.

Witnesses:
L. AUG. ROOSEN RUNZE,
C. SUVEN.